US005648903A

United States Patent [19]
Liubakka

[11] Patent Number: 5,648,903
[45] Date of Patent: Jul. 15, 1997

[54] FOUR WHEEL STEERING CONTROL UTILIZING FRONT/REAR TIRE LONGITUDINAL SLIP DIFFERENCE

[75] Inventor: Michael Kenneth Liubakka, Livonia, Mich.

[73] Assignee: Ford Global Technologies, Inc., Dearborn, Mich.

[21] Appl. No.: 500,670

[22] Filed: Jul. 10, 1995

[51] Int. Cl.⁶ .................................................. B62D 6/00
[52] U.S. Cl. ........................ 364/424.051; 364/424.058; 364/426.011; 364/426.037; 180/197; 180/410; 180/422; 280/91.1
[58] Field of Search ............... 364/424.051, 424.052, 364/424.058, 426.01, 426.015, 426.016, 426.027, 426.037; 180/197, 410, 411, 412, 413, 421, 422; 280/91.1

[56] References Cited

U.S. PATENT DOCUMENTS

| | | | |
|---|---|---|---|
| 4,412,594 | 11/1983 | Furukawa et al. | 180/140 |
| 4,441,572 | 4/1984 | Ito et al. | 180/140 |
| 4,645,025 | 2/1987 | Ohe et al. | 180/79.1 |
| 4,679,809 | 7/1987 | Ito et al. | 280/91 |
| 4,690,431 | 9/1987 | Ito et al. | 280/771 |
| 4,718,685 | 1/1988 | Kawabe et al. | 280/91 |
| 4,865,146 | 9/1989 | Ohe | 180/79.1 |
| 4,901,811 | 2/1990 | Uno et al. | 180/140 |
| 4,936,401 | 6/1990 | Baraszu et al. | 180/79.1 |
| 4,971,174 | 11/1990 | Abe et al. | 180/140 |
| 4,998,593 | 3/1991 | Karnopp et al. | 180/140 |
| 5,014,801 | 5/1991 | Hirose | 180/140 |
| 5,019,982 | 5/1991 | Furukawa | 364/424.05 |
| 5,054,568 | 10/1991 | Shiraishi et al. | 180/140 |
| 5,201,382 | 4/1993 | Edahiro et al. | 180/197 |
| 5,225,983 | 7/1993 | Ohmura et al. | 364/424.05 |
| 5,228,757 | 7/1993 | Ito et al. | 364/426.01 |
| 5,316,099 | 5/1994 | Inoue et al. | 180/140 |
| 5,363,440 | 11/1994 | Abe et al. | 364/424.05 |
| 5,402,341 | 3/1995 | Liubakka | 364/424.052 |
| 5,482,133 | 1/1996 | Iwata et al. | 180/197 |
| 5,488,555 | 1/1996 | Asgari | 364/424.051 |
| 5,576,959 | 11/1996 | Hrovat et al. | 180/197 |

*Primary Examiner*—Gary Chen
*Attorney, Agent, or Firm*—Roger L. May; Richard D. Dixon

[57] ABSTRACT

A four wheel steering strategy determines when the rear tire longitudinal slip becomes greater than the front tire longitudinal slip, either due to braking or acceleration, such that the rear tire slip angles must be increased to maintain vehicle balance with respect to the level of understeer/oversteer. The out-of-phase rear steering angle is reduced or the in-phase rear steering angle is increased to increase the rear tire slip angles and thereby correct vehicle balance. Three embodiments are disclosed which use estimated tire longitudinal slips, wheel speeds, and engine throttle information, respectively. The required inputs for the various embodiments can be obtained from independent sensors or preferably are available from other vehicle systems such as an anti-lock braking system, a traction control system or an engine management system. Advantageously, the present invention operates without requiring expensive sensors such as yaw sensors which are currently not feasible for mass market use.

7 Claims, 8 Drawing Sheets

1

FOUR WHEEL STEERING CONTROL UTILIZING FRONT/REAR TIRE LONGITUDINAL SLIP DIFFERENCE

BACKGROUND OF THE INVENTION

The present invention relates in general to four wheel steerable systems for use on motor vehicles having front and rear steerable wheels and, more particularly, to improved control of rear steerable wheels on such motor vehicles during combined braking and steering events and/or combined accelerating and steering events.

Four wheel steering systems for use on motor vehicles having front and rear steerable wheels are known in the art. Typically, the front steerable wheels are manually controlled by the vehicle operator and the rear steerable wheels are mechanically or electronically controlled based on the position of the front steerable wheels and other vehicle operating parameters including, for example, speed, yaw rate, lateral acceleration, steering torque, and tire operation region, i.e., linear or nonlinear.

One particular four wheel steering control system is disclosed in U.S. Pat. No. 5,402,341, which issued to Liubakka et al., is assigned to the same assignee as the present application and is hereby incorporated by reference. The '341 patent discloses an open loop control strategy which improves vehicle handling in the nonlinear region of the tires. In particular, it decreases unwanted understeer when the tires are near the limit of adhesion. Since most current production motor vehicles are designed with some amount of understeer, the ability to reduce this designed-in understeer for certain operating conditions can provide significant handling improvements.

As newer vehicle operating systems including anti-lock braking systems (ABS), traction control, four wheel steering, and unconventional suspensions, e.g., variable damping rate, semi-active, or active suspensions, become more sophisticated, passenger vehicles can be made to perform closer to the tire limits while maintaining or even increasing the handling safety margins. For example, oversteer induced by locking the rear wheels is reduced by ABS, and oversteer induced by excessive rear wheel spin is reduced by traction control. Therefore, cars with such systems may not need as large an understeer characteristic from the suspension and steering. Vehicle understeer may also be reduced significantly in performance sports cars and racing cars where more neutral handling is desired.

While the four wheel steering strategy of the '341 patent is a noticeable improvement over prior art systems during many vehicle operating conditions, during some vehicle operating conditions its operating characteristics are less than desired since it may remove too much understeer.

Thus, there is a need for an improved four wheel steering strategy which overcomes the shortcomings of the prior art.

SUMMARY OF THE INVENTION

The present invention meets this need by determining when the rear tire longitudinal slip becomes greater than the front tire longitudinal slip, either due to braking or acceleration, such that the rear tire slip angles must be increased to maintain vehicle balance with respect to the level of understeer/oversteer. In the present invention, the out-of-phase rear steering angle is reduced or the in-phase rear steering angle is increased to increase the rear tire slip angles and thereby correct vehicle balance. The present invention can be implemented in a number of ways which use estimated tire longitudinal slips, wheel speeds, engine torque, or engine throttle information which can be obtained from independent sensors or may be available from other vehicle systems such as an anti-lock braking system, a traction control system or an engine management system. Advantageously, the present invention operates without requiring expensive sensors such as yaw sensors which are currently not feasible for mass market use.

In accordance with one aspect of the present invention, a method of improving vehicle handling for use with a vehicle having manually operable front steerable wheels and electronically controlled rear steerable wheels, the front and rear steerable wheels each including a tire comprises the steps of: calculating a desired rear steer angle based on vehicle speed and front wheel angle during operation in a linear region of the tires; determining if the vehicle is operating in a nonlinear region of the front tires; calculating a handling term if the vehicle is operating in the nonlinear region of the front tires; determining if the magnitude of average rear tire longitudinal slip is greater than the magnitude of average front tire longitudinal slip; adjusting the handling term to compensate for reduced rear cornering force if the magnitude of the average rear tire longitudinal slip is greater than the magnitude of the average front tire longitudinal slip; modifying the desired rear steer angle based on the handling term to obtain a modified desired rear steer angle; and, steering the rear steerable wheels toward the modified desired steer angle.

It is, thus, a feature of the present invention to provide improved four wheel steering control during steering events which are combined with acceleration or braking by detecting probable oversteer due to the acceleration or braking and counteract the probable oversteer by reducing an out-of-phase handling term.

Other features and advantages of the invention will be apparent from the following description, the accompanying drawings and the appended claims.

DETAILED DESCRIPTION OF THE INVENTION

Figure 1:
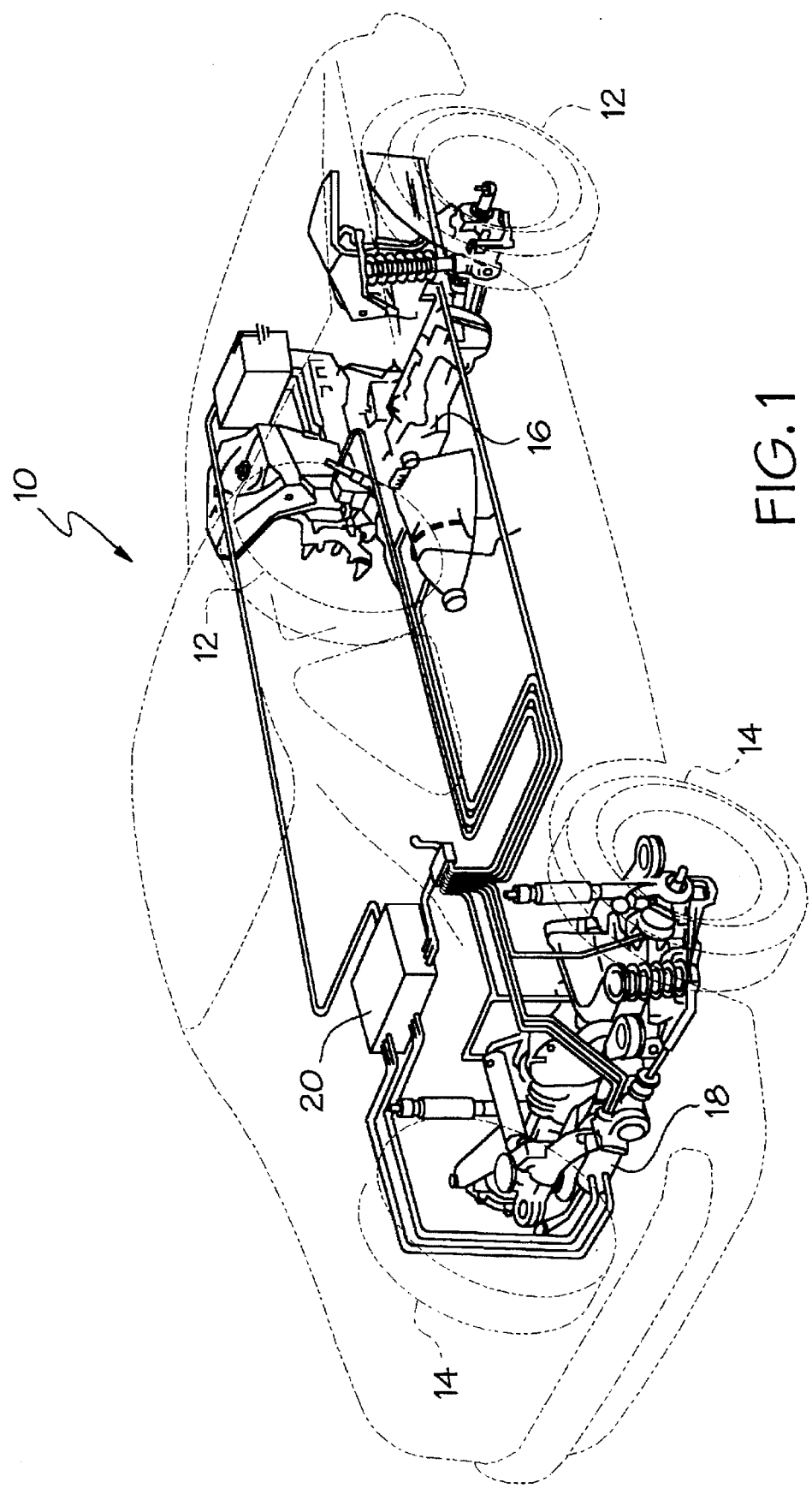
FIG. 1 is a perspective view of a motor vehicle in outline having front and rear steerable wheels which can be controlled in accordance with the present invention.

Referring now to FIG. 1, a motor vehicle, shown generally by reference numeral 10, is equipped with front steerable wheels 12 and rear steerable wheels 14. The front steerable wheels 12 are steered by a front steering gear assembly 16 and the rear steerable wheels 14 are steered by a rear steer gearing assembly 18. The front steerable wheels 12 are manually operable by a vehicle operator and the rear steerable wheels 14 are controlled by an electronic controller 20.

Figure 2:
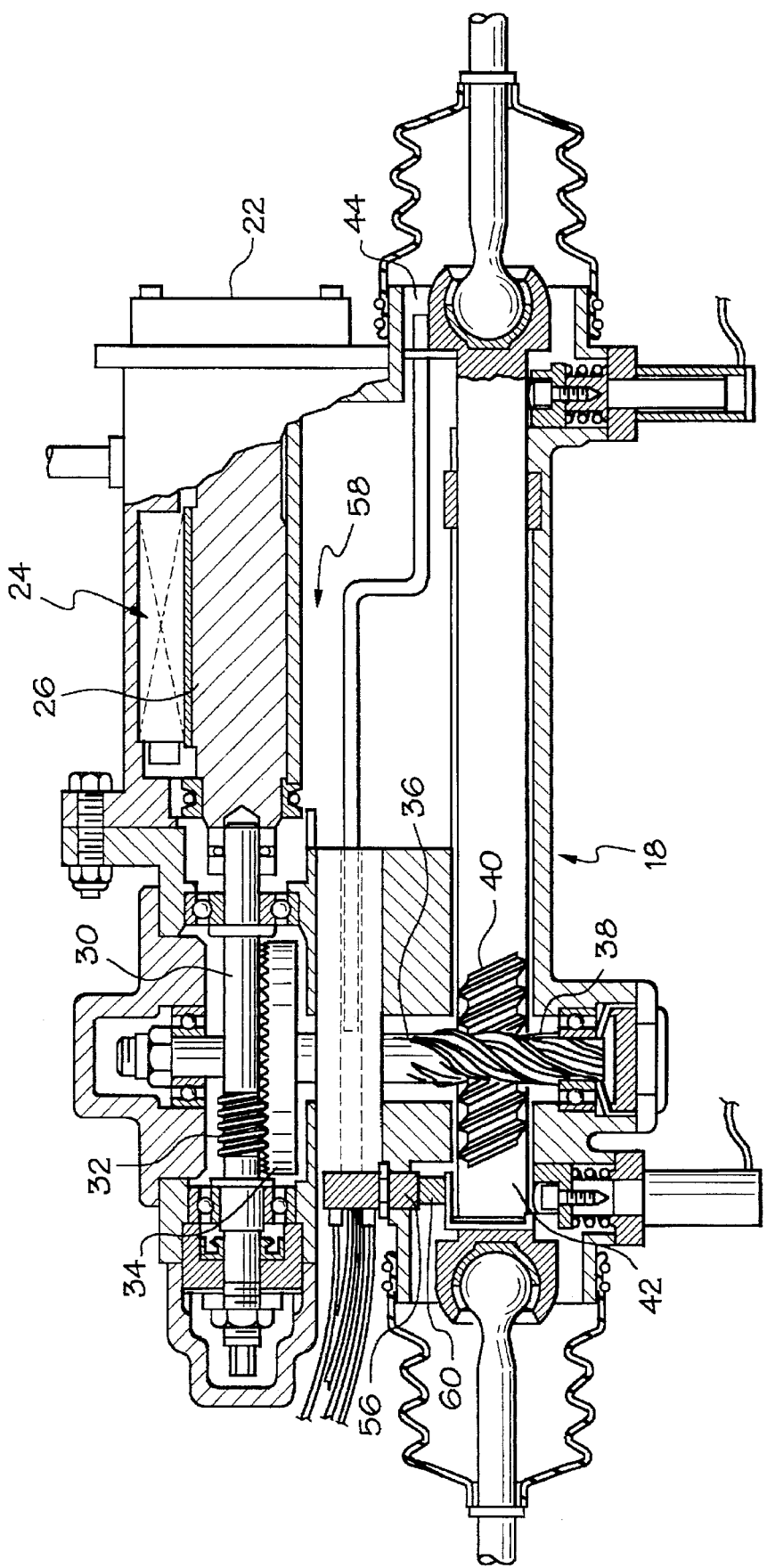
FIG. 2 is a partially sectioned view of a rear steering gear assembly of the vehicle of FIG. 1.

The rear steering gear 18 is shown in greater detail in FIG. 2. In the preferred embodiment, the steering gear 18 is electrically controlled by the electronic controller 20, seen in FIG. 1, and driven by a motor 22 having stator windings 24 and an armature 26. In the preferred embodiment, the motor 22 is a brushless DC motor commercially available from Sierracin/Magnedyne, of Carlsbad, Calif., United States of America. Alternatively, the rear steering gear 18 could be hydraulically driven.

As shown in FIG. 2, a motor shaft 30 and motor pinion 32 rotate in response to commands from the controller 20. The motor pinion 32 drives a face gear 34, which is mounted upon a pinion shaft 36. Rack pinion 38, which is formed at one end of the pinion shaft 36, meshes with teeth 40 which are formed on a rack 42. Thus, as the motor 22 rotates in response to commands from the controller 20, rack 42 will be caused to slide back and forth within a housing 44, thereby pushing or pulling steering rods (not specifically illustrated) and steering the rear steerable wheels 14. The steering system is described in greater detail in U.S. Pat. No. 4,936,401, which issued to Baraszu et al., is assigned to the assignee of the present invention, and is hereby incorporated by reference.

Figure 3:
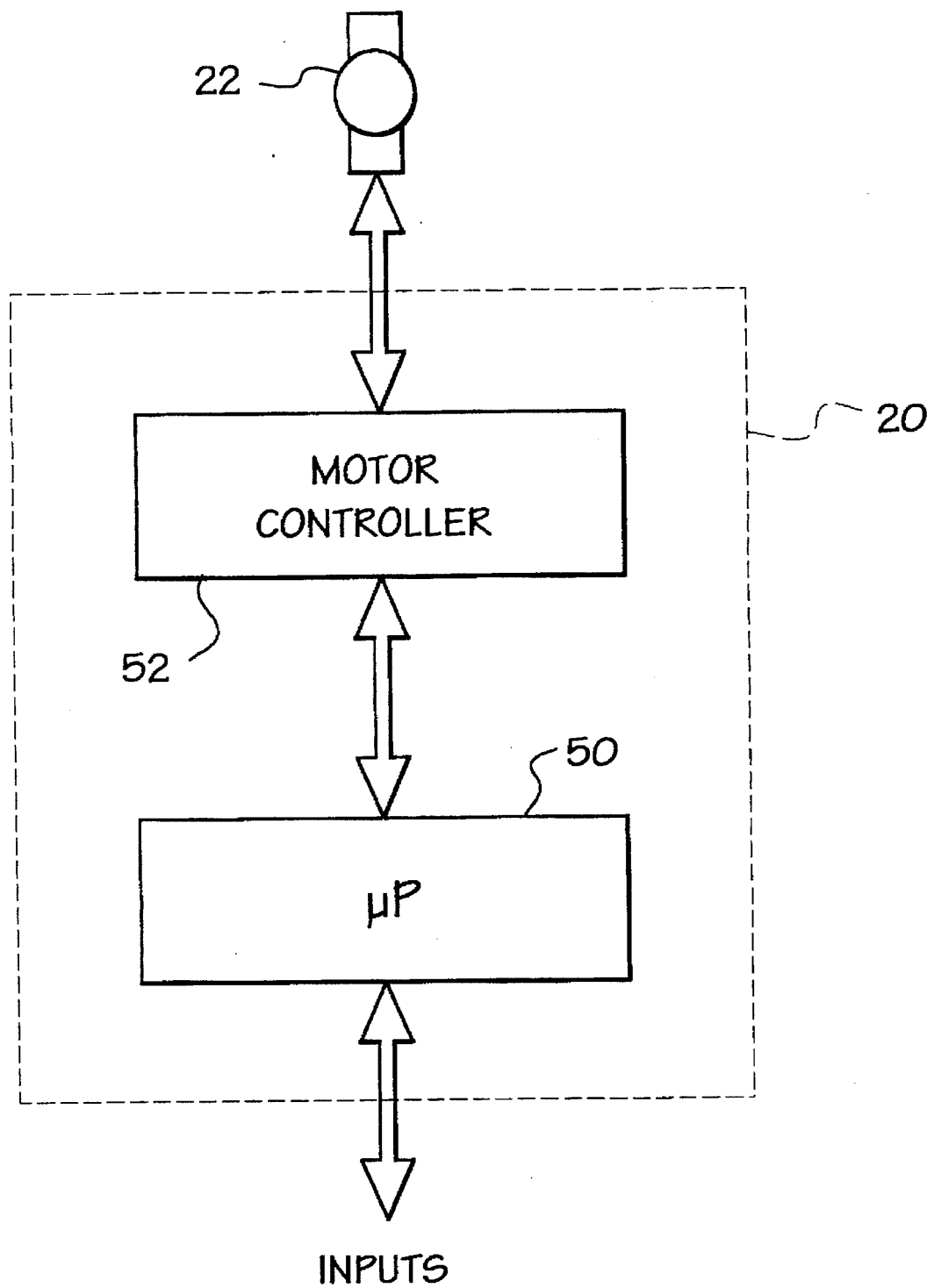
FIG. 3 is a block diagram of a controller for the rear steerable wheels of the vehicle of FIG. 1.

Referring now to FIG. 3, there is shown a block diagram of the controller 20, which includes a microprocessor 50 and a motor controller 52. In the preferred embodiment, the microprocessor 50 is an 8096 microprocessor and is utilized to implement the four wheel steering control strategy. The motor controller 52 manages delivery of power to, and commutation of, motor 22, which is preferably driven with pulse-width modulated (PWM) field effect transistors (FET). The microprocessor 50 and the motor controller 52 include random access and read-only memories (RAM/ROM), analog-to-digital converters, and the like, not specifically illustrated. The RAM memory is utilized as a temporary storage device for various data related to the operation of the rear steering gear 18 and the ROM stores the program which implements the four-wheel steering strategy of the present invention as well as other information, such as constants. The microprocessor 50 communicates with the motor controller via a digital signal link.

As best shown in FIG. 2, the rear steering gear 18 utilizes a first sensor 56 for sensing the on-center position of the steering rack and a second sensor 58 to sense the position of the rack at any point along its path of travel. Preferably, the sensor 56 is a Hall-effect sensor mounted within the steering gear housing 44. The Hall-effect sensor 56 is triggered by a magnet 60, which is rigidly attached to the rack 42 and which reciprocates therewith as the rack slides back and forth during steering motion. When the Hall-effect sensor 56 is triggered, an electrical signal is sent to the controller 20 indicating that the rear steering gear 18 is in the center position (i.e. zero steer angle). The second sensor 58 is an LVDT (linear variable differential transformer) which senses the position of the rack 42 at any point along its path of travel so as to provide a steering position signal to the controller 20. The LVDT 58 provides a voltage signal to the controller 20 which is a direct indication of the position of the rack 42. The controller 20, utilizing signals from the Hall-effect sensor 56, LVDT 58 and a vehicle speed sensor (not specifically illustrated) actively controls the steer angles of the rear steering gear 18 so as to improve the handling performance of the vehicle 10, as described in greater detail herein below. The front steering gear 16 (not shown in detail) is similar to rear steering gear 18 and includes identical position sensors 56 and 58.

Figure 4:
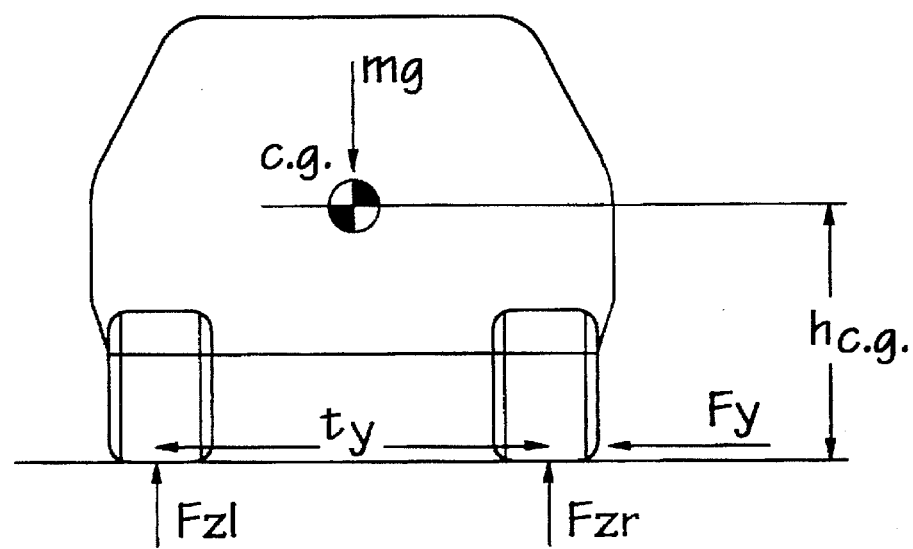
FIG. 4 is a schematic front view of a vehicle illustrating various force vectors.
Figure 5:
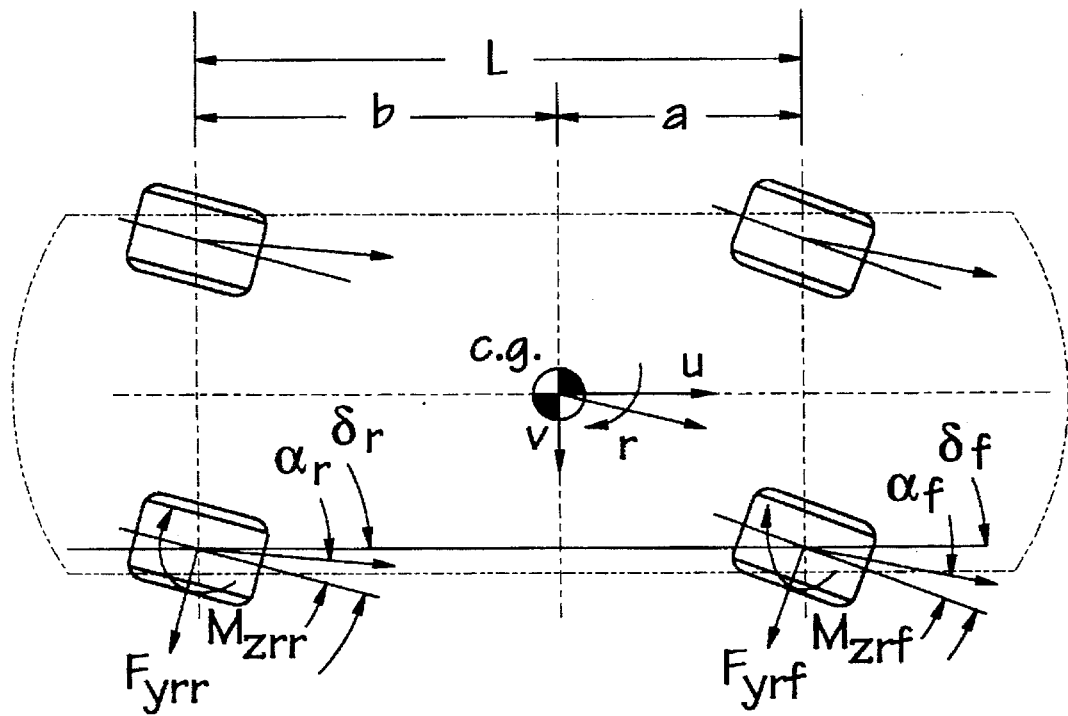
FIG. 5 is a schematic plan view of the vehicle of FIG. 4 illustrating in-phase steering of the front and rear steerable wheels.

FIGS. 4 and 5 illustrate a number of force vectors which operate on a motor vehicle and define terms used in the invention of the present application and in referenced U.S. Pat. No. 5,402,341. As illustrated, the front axle is separated from the rear axle by a distance L. The front axle is a distance a from the center of gravity c.g. of the vehicle and the rear axle is a distance b from the center of gravity c.g. of the vehicle. Tire slip angles $\alpha f$ and $\alpha r$ are measured as the difference between the tire plane, perpendicular to the axis of rotation, and the tire velocity vector. The front wheel steer angle $\delta f$ is input by the operator of the vehicle and the rear wheel input $\delta r$ is input by the controller 20. The lateral or sideslip velocity v of the center of gravity c.g. and vehicle velocity u are shown in FIG. 5, together with the yaw rate r.

The vehicular environment described with reference to FIGS. 1–5 can be controlled in accordance with the teachings of the referenced '341 patent. However, as previously noted, while the four wheel steering strategy of the '341 patent is a noticeable improvement over prior art systems during many vehicle operating conditions, during some vehicle operating conditions, its operating characteristics are less than desired since it may remove too much understeer. To improve upon the steering strategy of the '341 patent, the four wheel steering system must be designed as part of an interactive vehicle dynamics system to modify the understeer/oversteer characteristics of a vehicle operating near the limit of tire adhesion. In particular, the invention of the present application accounts for the tractive or braking forces generated at the rear tires in determining desired rear steer angles. Thus, greater control over vehicle understeer/oversteer behavior in combined braking and steering or accelerating and steering events is provided.

Such a design can be done with feedback control measuring vehicle parameters such as the yaw rate r of the vehicle, or, preferably, as in the invention of the present application, it can be done by utilizing vehicle operating parameters which are frequently available from existing vehicle systems. Such vehicle operating parameters include estimated tire longitudinal slips, wheel speeds, engine torque, or throttle information which can be received from an ABS system, a traction control system, an engine management system or from independent sensors. The use of such vehicle operating parameters avoids yaw sensors which are currently not feasible for mass market use. Three embodiments of the present invention will be described.

Since the present invention is an improvement on the four wheel steering strategy of referenced U.S. Pat. No. 5,402,341, the basic strategy of the '341 patent will be described briefly herein as is needed to permit an understanding of the present invention. If additional details of the basic strategy of the '341 patent are desired, the reader is referred to that patent for a more in depth description.

The basic four wheel steering strategy of the '341 patent forms a shell into which the invention of the present application is inserted. The shell strategy of the '341 patent will be described with corresponding functional blocks of the flow charts of FIGS. 6–8 being labeled the same in FIGS. 6–8. The basic four wheel steering strategy of the '341 patent reads in sensor inputs, e.g. vehicle speed or velocity u, front steer angle $\delta f$, and rear steer angle $\delta r$; calculates a desired rear wheel angle δr_des; and, steers the rear wheels 14 to the desired rear wheel angle δr_des, see blocks 70, 72, 74. The desired rear wheel angle δr_des is computed from a linear control law using gains that vary with speed, see block 76.

The desired rear wheel angle δr_des is then modified by a handling term δh when the vehicle is operating near or above the front tire limit of adhesion, i.e., if the absolute value of the front steer angle δf is greater than a tire saturation angle δs, see block 78. The handling term δh is calculated using a handling gain Kh which is multiplied by the difference between the absolute value of the front steer angle |δf| and a tire saturation angle δs, see block 80. In the basic four wheel steering strategy of the '341 patent, the resulting handling term δh is added to the desired rear wheel angle δr_des if the front steer angle δf is not greater than 0; and, the resulting handling term δh is subtracted from the desired rear wheel angle δr_des if the front steer angle δf is greater than 0, see blocks 82, 84, 86. Thus, with respect to FIGS. 6–8, the block 80 is effectively directly connected to the block 82 for the basic four wheel steering strategy of the '341 patent.

The strategy of the '341 patent is to detect probable understeer and counteract the understeer by adding an out-of-phase handling term to the desired rear wheel angle δr_des to arrive at a modified desired rear wheel angle. Out-of-phase rear steering is steering the rear wheels in the direction opposite to the direction of the front wheels. The out-of-phase handling term is proportional to the amount of front steer angle δf which is greater than a predefined speed dependent limit which corresponds to the tire saturation angle δs. Basically, at a given speed when a vehicle is operating properly, the vehicle will only respond to a certain amount of front steer angle δf. For larger steer angles, the vehicle will begin to understeer, and the four wheel steering system will attempt to reduce this understeer by either reducing in-phase rear steer or adding out-of-phase rear steer. When the vehicle is braking or has excessive rear wheel slip due to acceleration, the understeer is also reduced. This further reduction in understeer can degrade the performance of the '341 patent rear steering strategy and is addressed by the invention of the present application.

Even if the vehicle is not operating under normal conditions the basic open loop four wheel steering strategy of the '341 patent will generally help performance. If the vehicle has more understeer than normal, i.e., if the front tires have less grip relative to the rear tires than normal, the four wheel steering will still decrease understeer, just not to the extent it would otherwise. If the vehicle has less understeer than normal the driver will use smaller steer angles, and the handling portion of the four wheel steering system will operate less or not at all. In cases of extreme oversteer requiring opposite lock steering, the handling portion of the four wheel steering strategy helps the driver by giving "opposite lock" at the rear wheels as well.

Figure 9:
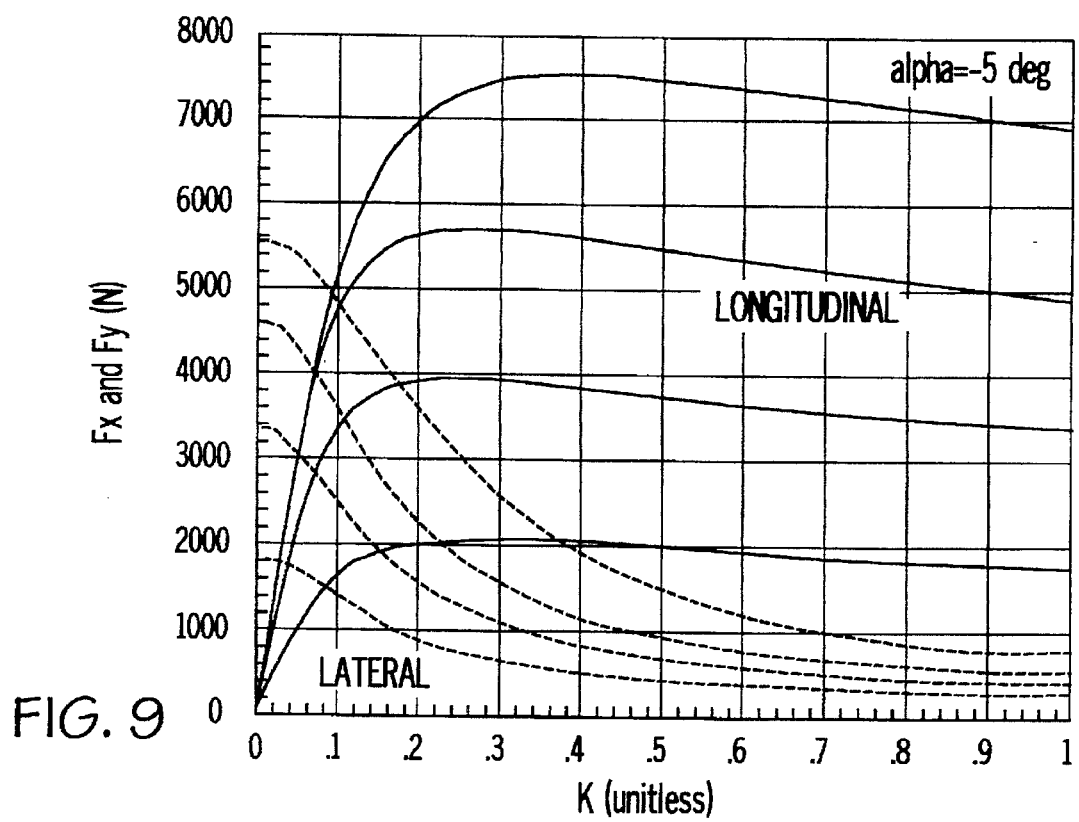
FIG. 9 is graph of longitudinal and lateral tire forces with a fixed slip angle of 5°.
Figure 10:
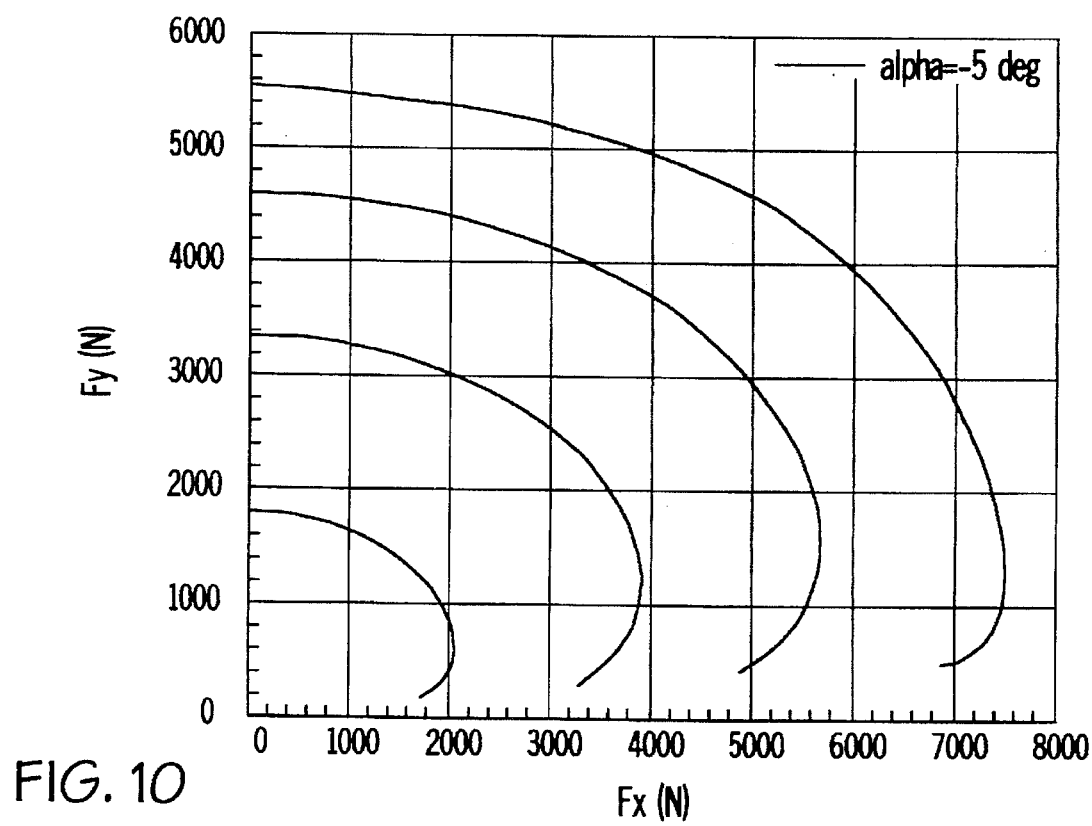
FIG. 10 is a graph of lateral versus longitudinal tire forces at a fixed slip angle of 5°.

The invention of the present application modifies the handling term of the basic four wheel steering strategy of the '341 patent to compensate for the effects of longitudinal forces at the rear tires. Due to the friction circle effect of automobile tires, i.e., tradeoff between lateral tire force and longitudinal tire force when braking and accelerating, the optimal rear steer angles vary with longitudinal slips along with front steer angle and speed. FIGS. 9 and 10 show how available cornering force decreases with increased braking force and vice versa following the circular or ellipsoidal form of the curves of FIG. 10 leading to the term friction circle effect. Tractive forces give the same effect.

Stated more simply, as rear tire longitudinal slips become larger than front tire longitudinal slips, either through braking or accelerating, the rear tire slip angles must be increased to maintain the current vehicle balance with regard to the level of vehicle understeer/oversteer. Four wheel steering can achieve this by reducing out-of-phase rear steer or by increasing in-phase rear steer.

When inserted into the basic four wheel steering strategy of the '341 patent, the invention of the present application results in the following control strategy outline.

1) Calculate the desired rear wheel angle δr_des based on front wheel steer angle δf and the vehicle velocity u, assuming linear tire characteristics.

2) If the front wheel steer angle δf is below the saturation limit or saturation angle δs of the front tires, set the handling term δh to 0.

3) If the front wheel steer angle δf is greater than the saturation angle δs, compute the standard handling term δh.

4) If the average rear tire longitudinal slip is greater than average front tire longitudinal slip, reduce the handling term δh by an appropriate amount to compensate for reduced rear cornering force. These averages can be weighted toward the more heavily loaded outside tires if desired.

5) Steer the rear wheels to the desired rear wheel angle δr_des±δh.

The invention of the present application accomplishes step 4) as will now be described. In a first embodiment, estimates of the average front and rear longitudinal tire slips Kf, Kr are available from an ABS or traction control system. The estimates of the front and rear longitudinal tire slips Kf, Kr can then be used directly as shown in FIG. 6 wherein the blocks interposed between the block 80 and the block 82 illustrate operation of this embodiment of the invention.

After the handling term δh is calculated in block 80, the absolute value of the rear tire longitudinal slip |Kr| is compared to the absolute value of the front tire longitudinal slip |Kf|, see block 88. By using the absolute values of the front and rear tire longitudinal slips Kf, Kr, compensation can be made for both braking and acceleration events. The handling term δh is reduced in proportion to the difference between the absolute value of the rear tire longitudinal slip |Kr| and the absolute value of the front tire longitudinal slip |Kf|. The modification of the handling term δh is made by calculating a handling term multiplier δh_mult, see block 90, by which the handling term δh is multiplied, see block 92. The resulting reduction of the handling term δh reduces oversteer caused by either the rear wheels approaching lockup before the front wheels during braking or by the rear wheels spinning under acceleration. The "gain" of this implementation, which is a calibratable value, is 1/max_slip, see the block 90. When the front to rear slip difference is 0, the handling term δh is unmodified. As the front to rear slip difference approaches max_slip, the handling term δh goes to zero.

A minimum handling term multiplier min_δh_mult is normally set to 0 to keep the handling term δh from going negative or making the steerable rear wheels 14 steer in-phase with the steerable front wheels 12. If the handling term multiplier δh_mult is less than the minimum handling term multiplier min_δh_mult, the handling term multiplier δh_mult is set equal to the minimum handling term multiplier min_δh mult, see blocks 94, 96. A negative handling term δh could be beneficial in certain conditions, but it would degrade performance for a driver applying opposing lock steering. If the front tire slip is greater than the rear tire slip, the handling term δh is unmodified. Such will be the case if the front tires begin to lock under braking or if too much engine torque is applied in a car having driven front wheels.

Figure 6:
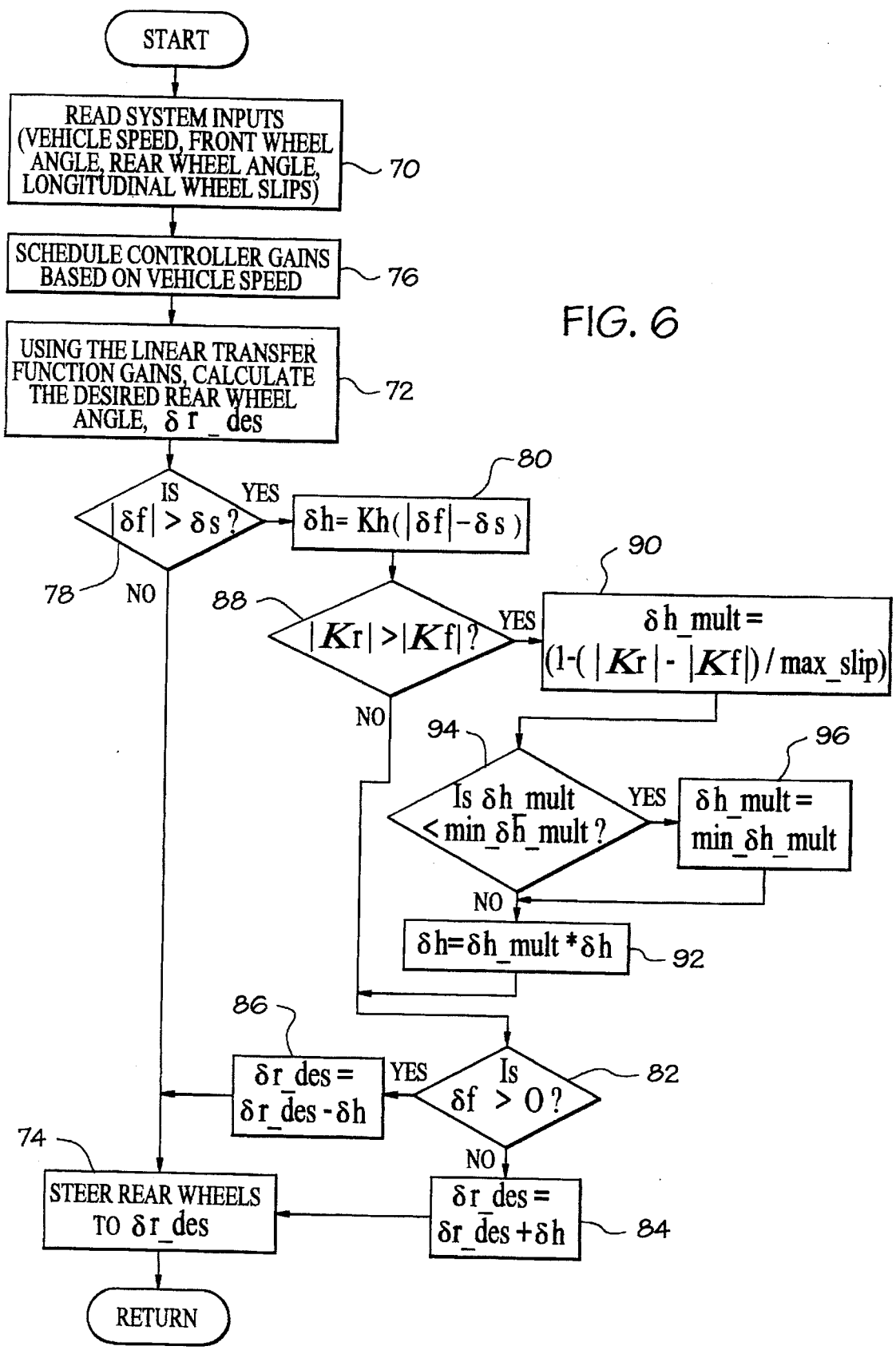
FIGS. 6, 7 and 8 are flow charts illustrating three embodiments for implementing the control strategy of the present invention.

The first embodiment of FIG. 6 is currently the preferred embodiment because of its robustness since it includes closed loop control through wheel slips. Also, this embodiment provides for the most straight forward coordination of ABS or traction control systems with the four wheel steering system. Such a coordinated or interactive system could more fully utilize the capabilities of the tires by controlling both the lateral slip angle and the longitudinal slip of the rear tires.

In a second embodiment of the present invention shown in FIG. 7, once again the blocks interposed between the block 80 and the block 82 illustrate operation of this embodiment of the invention. The second embodiment uses the average front and rear wheel speeds Vf and Vr. If the same size front and rear tires are used, rotational wheel speed can be used. Otherwise, wheel speed should be defined as wheel rotational velocity times the effective rolling radius of the tire. When using the average front and rear wheel speeds Vf and Vr, the first thing to determine is whether the vehicle is accelerating or decelerating, see block 98. This can be done by several means including differentiating wheel speeds, measuring longitudinal acceleration, obtaining brake system measurements such as brake pedal position or brake pressures, or by obtaining engine management measurements such as throttle position.

If the vehicle is decelerating and the average rear wheel speed Vr is less than the average front wheel speed Vf, the handling term δh is decreased in proportion to the difference between the average front wheel speed Vf and the average rear wheel speed Vr, see blocks 100, 102. The "gain" of this implementation, which is a calibratable value, is 1/max_slip, see the block 102. The modification of the handling term δh is made by calculating a handling term multiplier δh_mult, see block 102, by which the handling term δh is multiplied, see block 104. During deceleration, if the front wheel speed Vf is less than the rear wheel speed Vr, the handling term is unmodified, see block 100.

Figure 7:
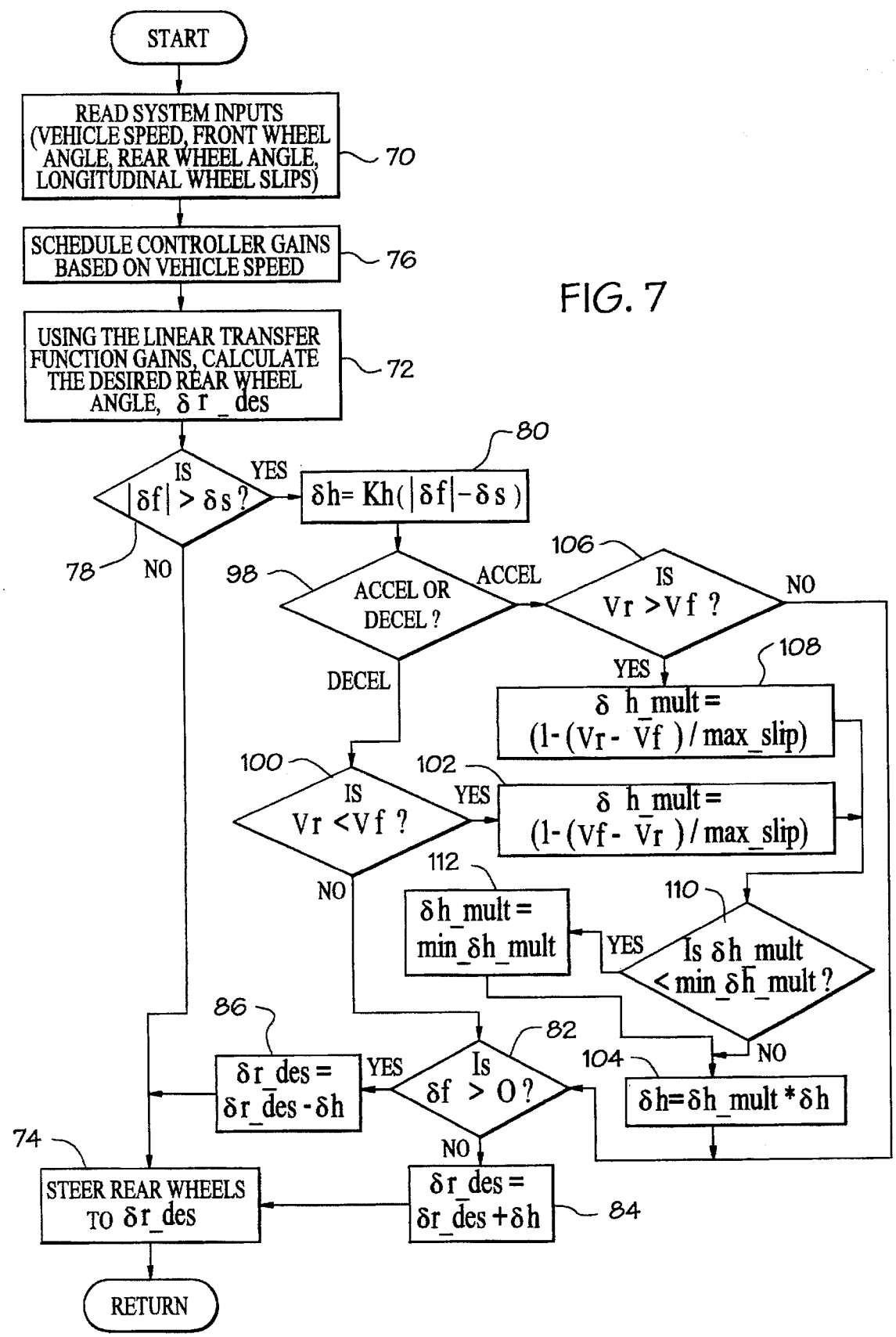

If the vehicle is accelerating, and the average front wheel speed Vf is less than the average rear wheel speed Vr, the handling term h is decreased in proportion to the difference of the average rear wheel speed Vr and the average front wheel speed Vf, see blocks 106, 108. Here again, the "gain" is 1/max_slip, see the block 108. As in the first embodiment, if the handling term multiplier δh_mult is less than the minimum handling term multiplier min_δh_mult, the handling term multiplier δh_mult is set equal to the minimum handling term multiplier min_δh_mult, see blocks 110, 112. During acceleration if the rear wheel speed Vr is less than the front wheel speed Vf the handling term is unmodified, see block 106. The second embodiment of FIG. 7 is very similar to the first embodiment of FIG. 6, but would be easier to implement in vehicles lacking ABS brakes or traction control.

Figure 8:
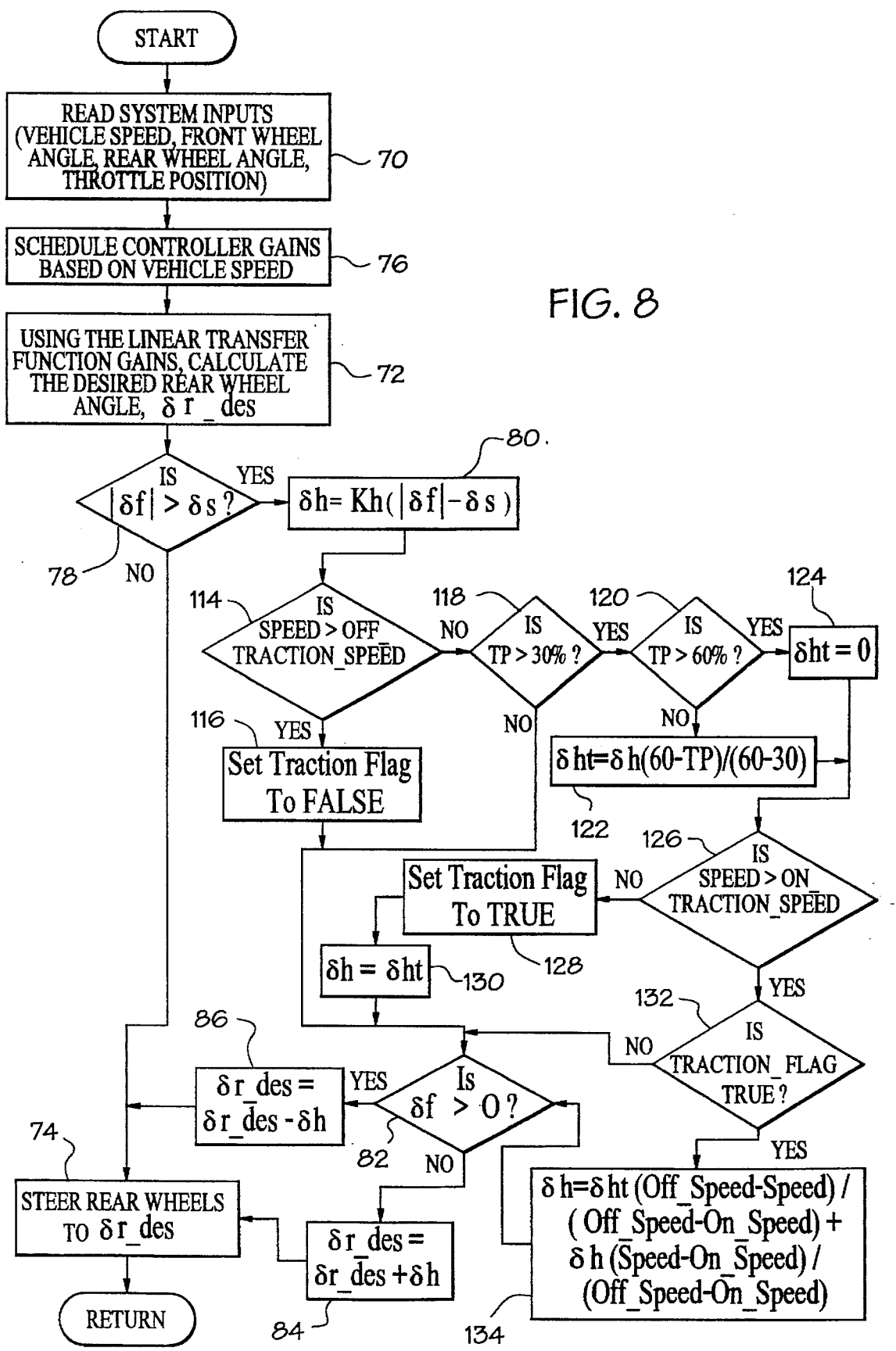

A third embodiment, which works under acceleration only, is used with engine management or traction control signals to estimate when excessive rear wheel torque or excessive rear wheel slip is being generated. Thus, it can be used in motor vehicles having rear or four wheel drive to reduce power oversteer exiting corners, which can be a disadvantage of the four wheel steering strategy of the '341 patent. An implementation of this embodiment using vehicle speed, for example estimated by the fastest front wheel speed of a rear wheel drive vehicle, and throttle pedal position is shown in FIG. 8 by the blocks interposed between the block 80 and the block 82.

After calculation of the standard handling term δh, see the block 80, vehicle velocity u is compared to an off_traction_speed above which the vehicle engine has insufficient power to spin the tires causing reduced understeer, see block 114. If the vehicle velocity u or speed is greater than the off_traction_speed such that the engine does not have enough excess torque to spin the tires, a traction flag is set to false and the standard handling term is used, see blocks 116, 82. If the vehicle velocity u or speed is not greater than the off_traction_speed, a modified handling term called the traction handling term δht is calculated. To this end, the throttle position TP is compared to 30% wide open throttle (WOT), see block 118. If the throttle position TP is below 30% WOT, the driver is not asking for enough torque to spin the wheels and the standard handling term is used, see the block 82.

The handling term δh must be modified to avoid power oversteer if the vehicle is accelerating and speed is below an on-traction-speed. The on_traction_speed also serves as a lower level for a hysteresis band with the off_traction_speed as the upper level above which modification of the handling term δh is unnecessary. It should be apparent that the on-traction-speed is set below the off_traction_speed and the hysteresis band provides a smooth transition between the control region wherein the handling term δh determined in the block 80 must be modified, below the on-traction-speed, to avoid power oversteer and the control region wherein modification of the handling term δh is unnecessary, above the off-traction-speed. While the off_traction_speed and the on_traction_speed must be set for each vehicle, during experimental operation of this embodiment of the present invention, on a 300 kilometer per hour (KPH) race car, the hysteresis band ranged between approximately 30 and 40 KPH.

Below the on_traction_speed and with more than 30% WOT the vehicle will begin to generate increasing rear tire slip and thus decrease rear cornering force. To counteract this, the traction handling term δht is calculated or set and ranges from the standard handling term δh down to 0 as the throttle pedal goes from 30% WOT to 60% WOT, see blocks 120, 122, 124. Below the on_traction_speed, the traction flag is set to true and the traction handling term δht is used in place of the standard handling term δh, see blocks 126, 128, 130. As previously mentioned, between the on_traction_speed and the off_traction_speed is a hysteresis band to smoothly change between the two different handling terms. Thus, if the vehicle velocity u or speed has been below on_traction_speed and then raises above on_traction_speed such that the traction flag is true, the modification of the handling term δh is phased out as a proportional combination of the originally calculated handling term δh and the traction handling term δht as described above, see blocks 132, 134. On the other hand, if the vehicle velocity u or speed has been above the off-traction-speed and then falls below the off-traction-speed, the handling term will not be modified until the vehicle speed falls below the on-traction-speed. This is handled by the hysteresis band and the traction flag settings.

The third embodiment works well in a racing environment where tuning to a specific vehicle and set of operating conditions is possible. In particular, the on_traction_speed, off_traction_speed and the two throttle points have to be tuned. In passenger car production the third embodiment would need calibration to a specific powertrain/vehicle combination. Also, being an open loop system, the third embodiment is potentially less robust than alternatives the first and second embodiments. However, an advantage of being open loop or feed-forward is that the third embodiment reacts more quickly to potential oversteer since it responds to driver inputs instead of the delayed vehicle responses. Therefore, the best overall system may be a combination of the third embodiment with the first or second embodiment.

Having thus described the invention of the present application in detail and by reference to preferred embodiments thereof, it will be apparent that modifications and variations are possible without departing from the scope of the invention defined in the appended claims.

What is claimed is:

1. A method of improving vehicle handling for use with a vehicle having manually operable front steerable wheels and electronically controlled rear steerable wheels, the front and rear steerable wheels each including a tire, said method comprising the steps of:

calculating a desired rear steer angle based on vehicle speed and front wheel angle during operation in a linear region of the tires;

determining if the vehicle is operating in a nonlinear region of the front tires;

calculating a handling term if the vehicle is operating in the nonlinear region of the front tires;

determining if the magnitude of average rear tire longitudinal slip is greater than the magnitude of average front tire longitudinal slip;

adjusting the handling term to compensate for reduced rear cornering force if the magnitude of the average rear tire longitudinal slip is greater than the magnitude of the average front tire longitudinal slip;

modifying the desired rear steer angle based on the handling term to obtain a modified desired rear steer angle; and steering the rear steerable wheels toward the modified desired steer angle.

2. A method as claimed in claim 1 wherein said step of adjusting the handling term comprises the steps of:

determining the difference between the magnitude of the average rear tire longitudinal slip and the magnitude of the average front tire longitudinal slip;

calculating a handling term multiplier from the difference between the magnitude of the average rear tire longitudinal slip and the magnitude of the average front tire longitudinal slip; and utilizing the handling term multiplier to modify the handling term.

3. A method as claimed in claim 2 wherein the step of utilizing the handling term multiplier to modify the handling term comprises the steps of:

determining whether the handling term multiplier is less than a minimum handling term multiplier;

setting the handling term multiplier equal to the minimum handling term multiplier if the handling term multiplier is less than the minimum handling term multiplier; and multiplying the handling term by the handling term multiplier.

4. A method as claimed in claim 1 wherein said step of adjusting the handling term comprises the steps of:

determining if the vehicle is accelerating or decelerating;

subtracting the velocity of the front wheels from the velocity of the rear wheels if the vehicle is accelerating and the velocity of the rear wheels is greater than the velocity of the front wheels;

subtracting the velocity of the rear wheels from the velocity of the front wheels if the vehicle is decelerating and the velocity of the front wheels is greater than the velocity of the rear wheels;

calculating a handling term multiplier from the difference between the velocity of the rear wheels and velocity of the front wheels; and utilizing the handling term multiplier to modify the handling term.

5. A method as claimed in claim 4 wherein the step of utilizing the handling term multiplier to modify the handling term comprises the steps of:

determining whether the handling term multiplier is less than a minimum handling term multiplier;

setting the handling term multiplier equal to the minimum handling term multiplier if the handling term multiplier is less than the minimum handling term multiplier; and multiplying the handling term by the handling term multiplier.

6. A method as claimed in claim 1 wherein said step of adjusting the handling term comprises the steps of:

determining the speed of the vehicle;

determining whether the speed of the vehicle is greater than an off traction speed above which an engine of the vehicle does not have sufficient power to spin the rear wheels;

monitoring a throttle position of the vehicle;

calculating a traction handling term if the speed of the vehicle is not greater than the off traction speed and the throttle position is greater than 30%;

determining whether the speed of the vehicle is greater than an on traction speed which is less than the off traction speed; and setting the handling term equal to the traction handling term if the speed of the vehicle is not greater than the on traction speed.

7. A method as claimed in claim 6 further comprising the step of setting the handling term equal to a sum of a scaled portion of the traction handling term and a scaled portion of the originally calculated handling term, the scaling being based on the vehicle speed, the off traction speed and the on traction speed.

* * * * *